Feb. 16, 1937.  E. L. BOWLES  2,071,195
SLIDE RULE
Filed April 14, 1933    2 Sheets-Sheet 1
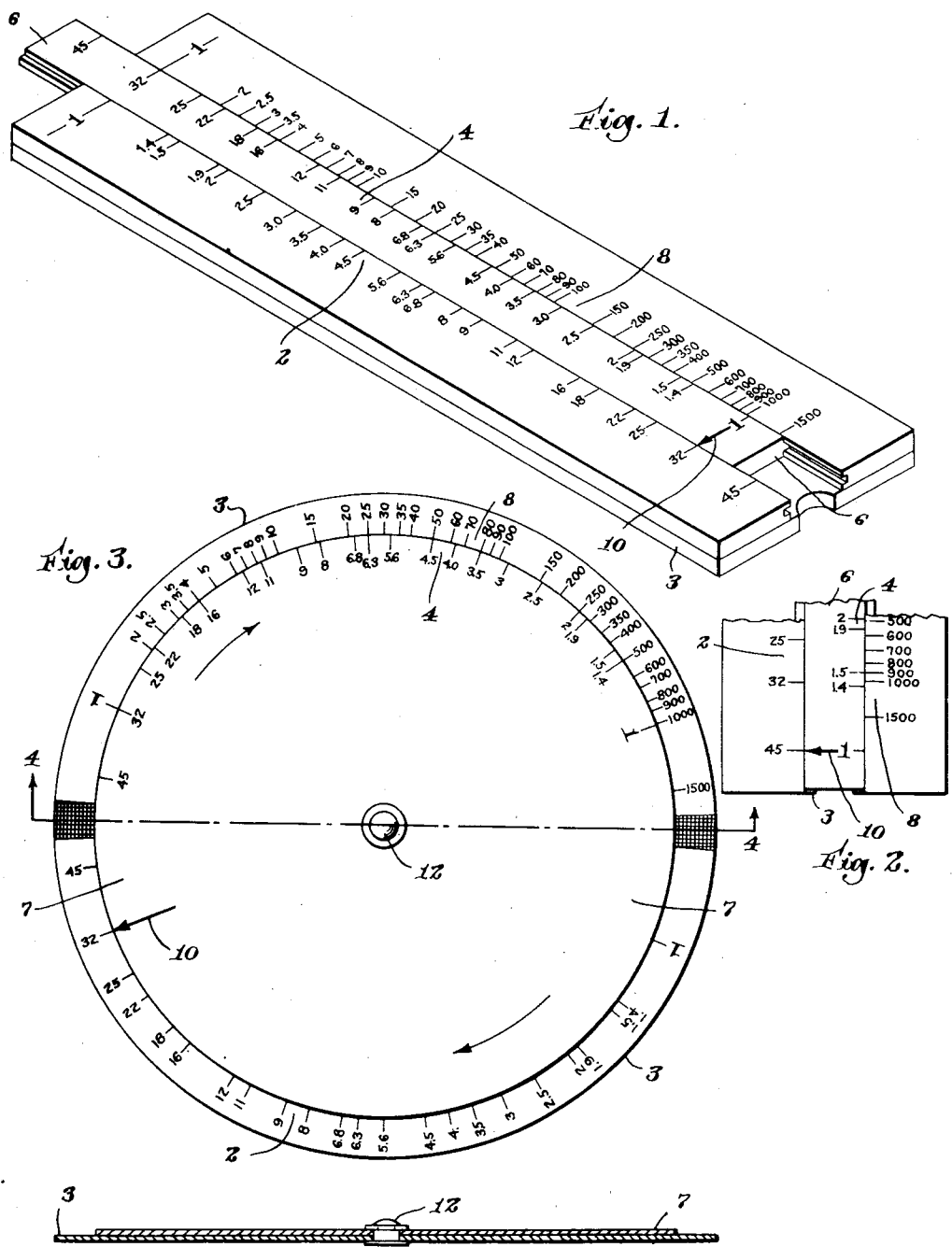
Inventor
Edward L. Bowles
by David Rines
Attorney Feb. 16, 1937.  E. L. BOWLES  2,071,195
SLIDE RULE
Filed April 14, 1933  2 Sheets-Sheet 2

Inventor
Edward L. Bowles
by [signature]
Attorney

Patented Feb. 16, 1937

2,071,195

UNITED STATES PATENT OFFICE 2,071,195

SLIDE RULE

Edward Lindley Bowles, Wellesley Farms, Mass.

Application April 14, 1933, Serial No. 666,131

2 Claims. (Cl. 235—70)

The present invention relates to slide rules, and it has for its chief object to provide a novel slide rule for determining rapidly the relative exposures in photographic work, such as the ratio of exposure for any two different stops.

Figure 5:
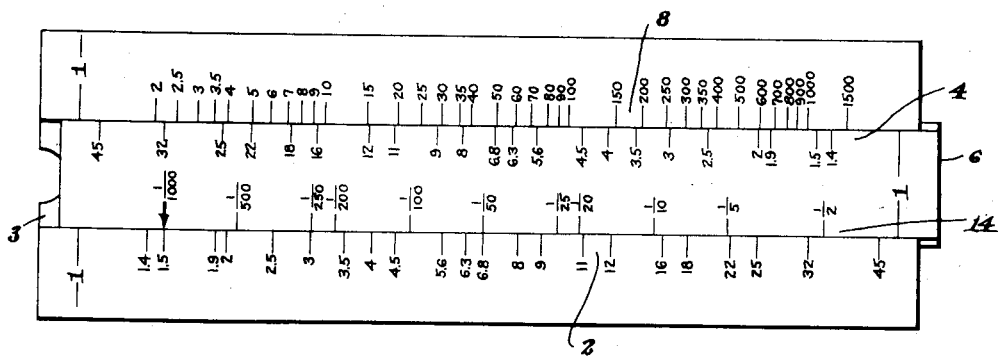
Figure 6:
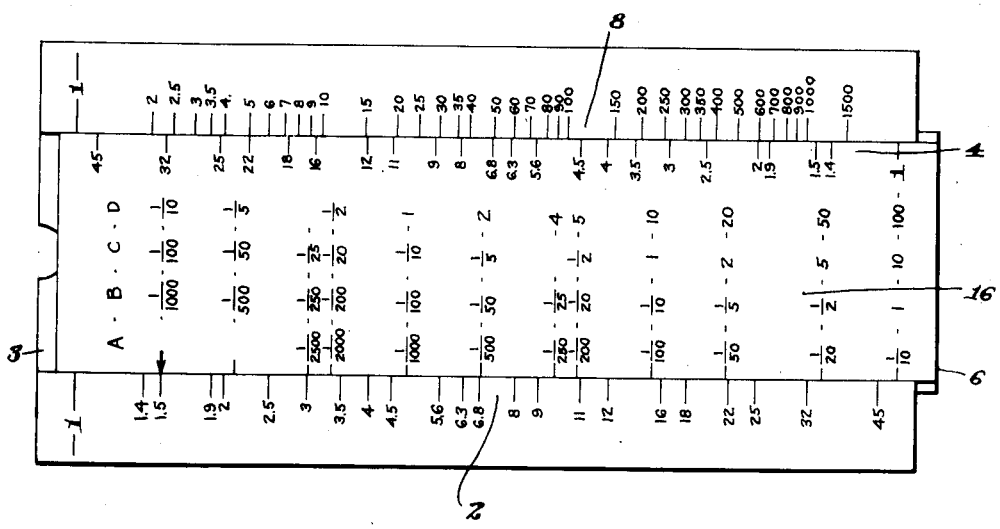

The invention will be explained more fully in connection with the accompanying drawings, in which Fig. 1 is a perspective of a slide rule constructed in accordance with a preferred embodiment of the present invention; Fig. 2 is a view of the same with the parts in different position; Fig. 3 is an elevation of a modification; Fig. 4 is a section taken upon the line 4—4 of Fig. 3, looking in the direction of the arrows; and Figs. 5 and 6 are views of further modifications.

A given lens, when stopped to $F_1$ and $F_2$, respectively, will have a ratio of exposure $$R = \left(\frac{F_2}{F_1}\right)^2$$

so that $$\log F_2 - \log F_1 = \frac{\log R}{2}$$

This relationship lends itself to arrangement for solution by a slide rule, properly engraved as to scales. The scale 2 is laid out logarithmically upon a base member 3. Scale 4, on the slide 6, is, in Fig. 1, laid out to the same logarithmic units, but in the opposite direction. Thus these two scales of the slide rule are arranged to perform the operation of yielding $$\log F_2 - \log F_1$$

and from the logarithmic equation above the result should be $$\frac{\log R}{2}$$

If, therefore, scale 8, which is fixed to the same base member 3 relatively to the scale 2, is laid out logarithmically to a unit scale such that there are twice as many units in a given length as in the scale 2, then the scale 8 will read $$\frac{\log R}{2}$$

and can be calibrated directly, just as in the cases of scales 2 and 4, to give the ratio of the exposure of any two stops.

If the arrow 10 on the slides 6 is placed opposite the stop F45 on the scale 2, the stop number F1.5, given on the scale 4 of the slide 6, will be opposite the corresponding factor 900 on the scale 8, as shown in Fig. 2, so that the indicated ratio of exposures for the stops 45 and 1.5 is, of course, 900. With this slide rule, it will then be possible conveniently to determine the exposure ratio between any two stops in photography.

In the circular form of slide rule, shown in Fig. 3, the base member 3 and the member 7 are in the form of discs, the scales 2 and 4 being pivoted together at 12. The scales 2 and 8 are inscribed at opposite sides of the circumference of the same base member 3, and the scale 4 along the circumference of the disc 7.

The ratio of two exposures $T_2$ and $T_1$ is as the ratio of the respective F stop numbers squared, or $$\frac{T_2}{T_1} = \left(\frac{F_2}{F_1}\right)^2$$

For the purpose at hand, this may be written $$\frac{\log T_2 - \log T_1}{2} = \log F_2 - \log F_1$$

This is graphically represented in Fig. 5, where the stops are engraved to a given logarithmic scale 2, and the exposures to a scale 14 one half as large. The stop-exposure ratio scales of Fig. 2 may thus, for convenience, be combined with the recognized stop-exposure scale 14.

The relationship between powers of 10 in the Briggs logarithmic system may be advantageously applied to multiply the range of the rule of Fig. 5, as in Fig. 6, where the exposure scale 16 corresponds to a multiplication of the scale of Fig. 5.

The slide-rule arrangement illustrated in Figs. 5 and 6 may also be made circular, as illustrated by Fig. 2.

Further modifications will occur to persons skilled in the art, and all such are considered to fall within the spirit and scope of the present invention, as defined in the appended claims.

What is claimed is:

1. A photographic slide rule comprising a first fixed member having a first logarithmic scale, a second fixed member having a second logarithmic scale extending in the same direction as the direction of the first scale, a movable member having a third logarithmic scale substantially the same as the first scale and laid out in the same logarithmic units as the first scale but extending in a direction opposite to the direction of the first and second scales, the first and the third scales each comprising two consecutively arranged sections the divisions of which are numbered with the consecutive stop numbers of a camera lens diaphragm, the numbers of one of the sections being the consecutive stop numbers from 1 to 10 and the numbers of the other section being the camera stop numbers from 10 to not exceeding 45, the sections being provided with such divisions only the said camera stop numbers of which are so related that the square of their ratio is the relative-exposure ratio for the two stops corresponding to said any two stop numbers, the logarithmic units of the second scale being such that a given length of the second scale contains twice as many units as the same length of the first scale or the third scale, the second scale comprising three consecutively arranged sections the divisions of which are numbered with the consecutive said relative-exposure ratios, the numbers of one of the said three sections being the said relative-exposure ratios from 1 to 10, the numbers of the next succeeding section of the said three sections being the said relative-exposure ratios from 10 to 100 and the numbers of the third section of the said three sections being the said relative-exposure ratios from 100 to not exceeding 1500, the third member having an index cooperating with the first scale, and the third scale being cooperatively related with the second scale so that the relative-exposure ratio of a given camera stop number on the first scale as indicated by the index and any one of the camera stop numbers on the third scale will be disposed on the second scale opposite the given camera stop on the third scale.

2. A photographic slide rule comprising a first fixed member having a first logarithmic scale, a second fixed member having a second logarithmic scale extending in the same direction as the direction of the first scale, a movable member having a third logarithmic scale substantially the same as the first scale and laid out in the same logarithmic units as the first scale but extending in a direction opposite to the direction of the first and second scales, the first and the third scales each comprising two consecutively arranged sections the divisions of which are numbered with the consecutive stop numbers of a camera lens diaphragm, the numbers of one of the sections being the consecutive stop numbers from 1 to 10 and the numbers of the other sections being the camera stop numbers from 10 to not exceeding 45, the sections being provided with such divisions only the said camera stop numbers of which are so related that the square of their ratio is the relative-exposure ratio for the two stops corresponding to said any two stop numbers, the logarithmic units of the second scale being such that a given length of the second scale contains twice as many units as the same length of the first scale or the third scale, the second scale comprising three consecutively arranged sections the divisions of which are numbered with the consecutive said relative-exposure ratios, the numbers of one of the said three sections being the said relative-exposure ratios from 1 to 10, the numbers of the next succeeding section of the said three sections being the said relative-exposure ratios from 10 to 100 and the number of the third section of the said three sections being the said relative-exposure ratios from 100 to not exceeding 1500, the third member having an index cooperating with the first scale, and the third scale being cooperatively related with the second scale so that the relative-exposure ratio of a given camera stop number on the first scale as indicated by the index and any one of the camera stop numbers on the third scale will be disposed on the second scale opposite the given camera stop on the third scale, the movable member having a further scale extending in the same direction as the first scale and laid out in logarithmic units such that a given length thereof contains one-half as many logarithmic units as the same length of the first scale, the divisions of the further scale being numbered with fractional relative-exposure ratios.

EDWARD L. BOWLES.